Dec. 6, 1938.  J. M. GANTVOORT  2,139,448
BAKER'S OVEN
Filed May 29, 1937
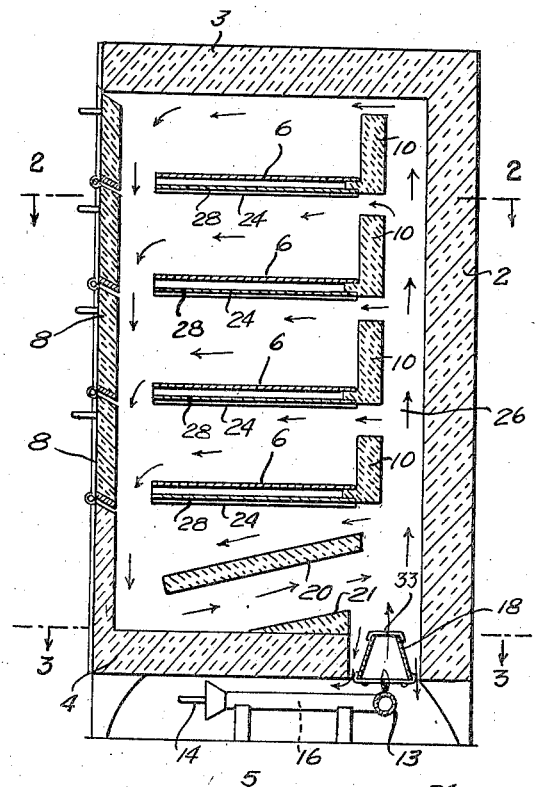
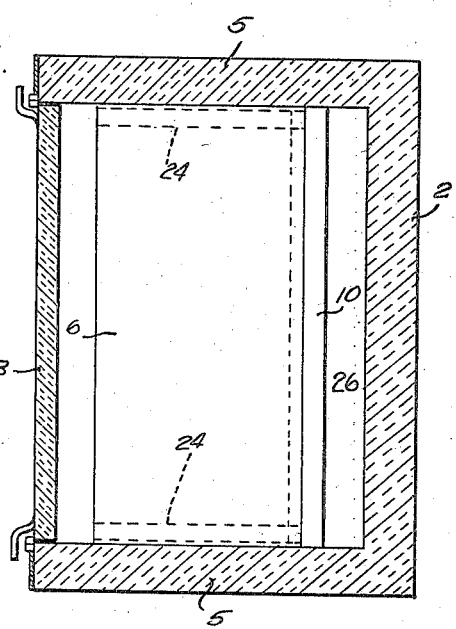
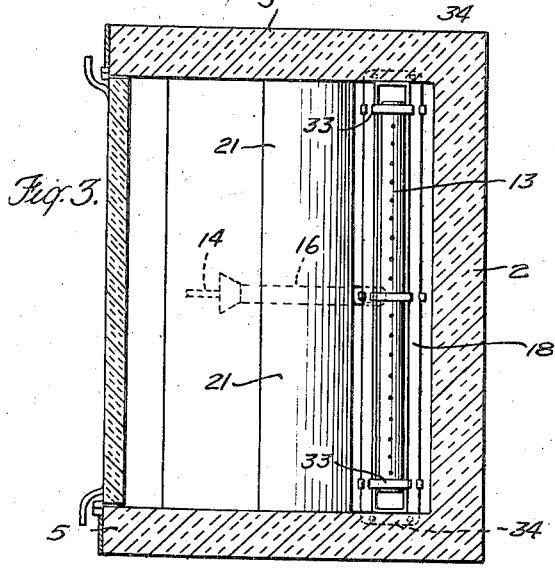
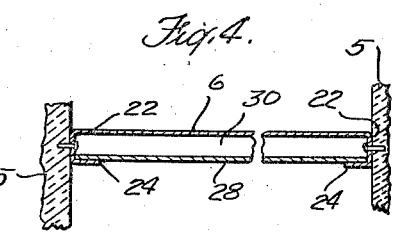
INVENTOR
JOHN M. GANTVOORT.
BY
Geo. M. Dowe,
ATTORNEY Patented Dec. 6, 1938

2,139,448

UNITED STATES PATENT OFFICE 2,139,448

BAKER'S OVEN

John M. Gantvoort, Bronxville Manor, N. Y.; Paul J. Miller administrator of said John M. Gantvoort, deceased Application May 29, 1937, Serial No. 145,552

2 Claims. (Cl. 107—55)

This invention relates to bakers' ovens heated by an open fire, preferably a gas burner, or by electric means, in which the baking is effected by the systematized circulation of convection currents.

One of the objects of the invention is the provision of an oven of the non-mechanical type in which the baking capacity is relatively large in proportion to its cubical contents.

Another object is the more efficient utilization of the heating currents, resulting not only in a more economical use of the fuel, but also in a more even distribution of temperature throughout the baking chamber of the oven.

A further object of the invention is the provision of an oven which may be heated by a gas flame located outside of the oven proper or by electric means located within the oven.

In the attainment of these and other objects, a feature of the invention relates to the location of the heat source at the rear of the oven directly under a heat flue which supplies heat to the baking chamber of the oven.

Another feature of the invention relates to a chimneyless oven provided with a heat flue at the rear of the baking chamber directly under which the source of heat is located, the bottom of the oven having a transverse opening at the rear thereof under which and outside of the oven proper is located a source of heat in the form of an open gas burner. When the source of heat is electrical, the opening may be closed and the source of heat located adjacent the bottom of the oven at the rear thereof but inside.

A further feature of the invention relates to the baffling of the oven so that the air currents flow through the baking chamber of the oven in the proper direction to maintain a substantially uniform temperature in different strata in the making chamber.

Further features and advantages will become apparent from the following description and claims when taken in connection with the accompanying drawing in which:

Figure 1 is a central sectional view through the oven;

Figure 2 is a section on the line 2—2 of Figure 1;

Figure 3 is a section on the line 3—3 of Figure 1; and

Figure 4 is a front elevation of one of the baking hearths.

Referring to the drawing, the oven comprises a rear wall 2, a top wall 3, a bottom wall 4 and side walls 5 all of which are suitably insulated. The baking chamber of the oven is divided into a number of baking compartments, each provided with a baking hearth 6. Access to each compartment is had through the medium of multiple doors 8.

At the rear of the hearth and extending transversely of the oven and supported in the side walls 5 thereof are a series of heat insulating baffles 10. Each baffle has a vertically extending portion and a horizontally extending foot. The hearths project over the horizontal portion or foot of each baffle and are also supported in the side walls of the oven. The vertical portion of each baffle extends to a point adjacent the baffle next above it with the exception of the topmost baffle which extends to a point adjacent the top 3 of the oven. The space between the uppermost baffle and the top of the oven is sufficient to permit hot gases to enter the uppermost baking chamber and the distance of each succeeding baffle from the one above it is slightly larger as is customary in ovens of this general character where a number of baking compartments are provided.

The vertical portion of each baffle is separated a slight distance from the rear wall 2 of the oven and form therewith a heat flue 26. Directly beneath this flue is located the source of heat. If the source of heat is electrical, it is situated just inside of the oven near the bottom thereof and adjacent the rear wall.

In the present embodiment the preferred source of heat is an open gas flame. A gas burner 13 for supplying the heat is located directly under the heat flue and outside of the oven proper. The heat of the burner is permitted to enter the oven through a transverse opening in the bottom wall 4 of the oven, adjacent the rear wall thereof. The gas for the burner is supplied through a pipe 14 leading to a mixer 16 having the usual means for regulating the air supply to the burner. By reason of the fact that the burner is located outside of the oven, the air supply is ample without the necessity for creating a draft for the supply of secondary air by means of a chimney. Hence a greater porportion of the heat of the burner is available for use in the baking compartments resulting in a more economical use of fuel. The location of the burner directly beneath the heat flue also reduces friction in the moving air currents thereby permitting these currents to move at greater speed. The height of the flue also contributes to the speed of movement of the ascending gases and the heated air is thus more quickly transferred to the baking chamber.

Due to the system of baffling illustrated, the air currents flow in the general direction indicated by the arrows in Figure 1 and thus a systematized circulation of convention currents is produced.

The heated air and gases passing from the burner when expanded sufficiently to create some pressure may escape through the opening in the bottom of the oven.

In order to facilitate the escape of gases under pressure and to interfere as little as possible with the burner, I provide a hood 18 which partly covers the opening in the bottom of the oven. The hood however, is spaced from the sides of the opening so that the heated gases as they expand may pass out of the oven along the sides of the hood.

Below the lowermost baking hearth is located a heat insulating current directing plate 20 which may be horizontal or may slant upwardly, the rear end being adjacent the rear of the lowermost baffle but spaced therefrom a sufficient distance to cause the hot gases to enter between the plate 20 and the lowermost hearth. The gases enter the several baking compartments of the oven and furnish heat to the goods to be baked in the form of downwardly moving convection currents and as they are further cooled will descend at the front of the oven and will pass under the directing plate 20 to be reheated. A current directing baffle 21 may also be provided. The source of heat however, is out of the path of the circulating currents but situated at a point where the horizontally moving currents are caused to move upwardly by said source of heat.

For baking goods requiring different amounts of bottom heat, I provide means whereby the bottom heat may be varied as required. To this end each of the hearths 6, which may be of sheet metal, are formed as shown in Figure 4 which is a front view. The sides of each hearth have downwardly projecting portions 22 and horizontal portions 24. A slide or shield 28 may be inserted to create a dead air space 30 between the shield and the hearth 6 which space acts as a heat insulator thereby lessening the degree of bottom heat supplied to the hearth 6 beneath which the plate or shield 28 has been inserted.

The hearth 6 extends over the foot or horizontal portion of each baffle 10 which prevents the rear portion of the hearth from being heated to a substantially higher degree than the front thereof. The end of the plate or shield 28 when inserted abuts the projecting foot of the baffle 10 and forms with it and the hearth 6 a dead air chamber.

The hood 18 may be supported by straps 33, Figures 1 and 3 which pass over the top of the hood near the center and near the ends thereof and by plates 34 at each end secured to the hood and to the underside of the walls 5 as shown in Figure 3.

When it is desired to heat the oven by electrical means, the hood 18 may be removed and the opening in the bottom wall 4 of the oven may be closed in any suitable manner.

What I claim is:

1. A baker's oven in which a plurality of superposed baking hearths are provided and in which an insulating baffle extends from each hearth at the rear thereof to a point adjacent the hearth next above it and the baffle of the uppermost hearth extends to a point adjacent the top of the oven; in combination, a heat insulating current directing baffle between the lowermost hearth and the bottom of the oven with its rear edge adjacent to but spaced from the rear of the lowermost hearth, said hearth baffles being spaced from the rear wall of the oven to form a heat flue and an open gas burner extending transversely of the oven at the rear thereof directly under the heat flue and outside of the oven proper.

2. A baker's oven in which a plurality of superposed baking hearths are provided and in which an insulating baffle extends from each hearth at the rear thereof to a point adjacent the hearth next above it and the baffle of the uppermost hearth extends to a point adjacent the top of the oven; in combination, a heat insulating current directing baffle between the lowermost hearth and the bottom of the oven with its rear edge adjacent to but spaced from the rear of the lowermost hearth, said hearth baffles being spaced from the rear wall of the oven to form a heat flue and a source of heat at the rear of the oven and outside of the oven proper.

JOHN M. GANTVOORT.